May 16, 1967 A. ROSE ETAL 3,319,403
CHROMATOGRAPHIC DEVICE
Filed Aug. 10, 1965 2 Sheets-Sheet 1
Fig. 1.
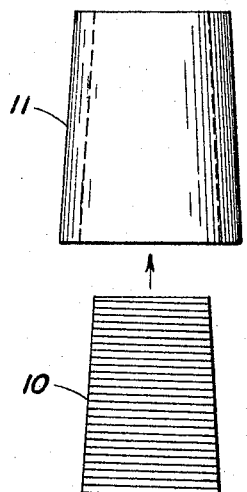
Fig. 2.
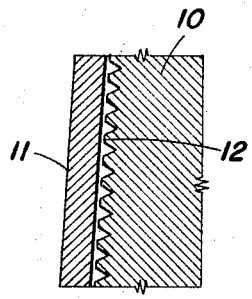
Fig. 4.
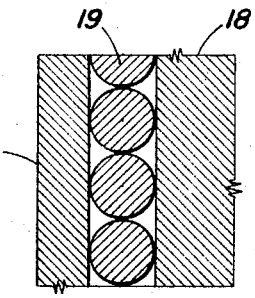
Fig. 3.
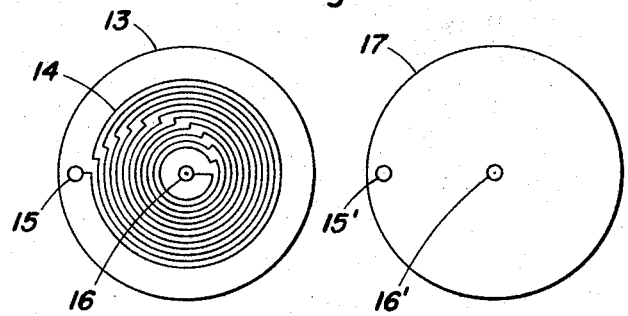
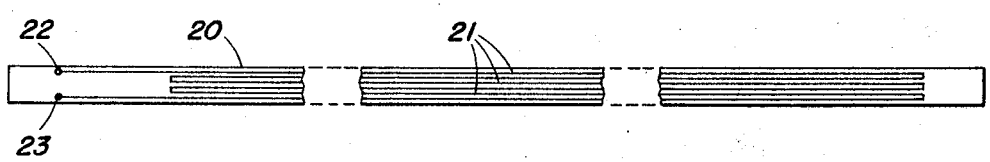
Fig. 5.
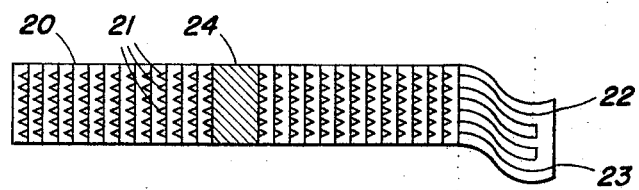
Fig. 6.
INVENTORS
Arthur Rose
Robert E. Kemper
BY
Charles J. Elderkin
ATTORNEY May 16, 1967

A. ROSE ETAL 3,319,403

CHROMATOGRAPHIC DEVICE

Filed Aug. 10, 1965

Arthur Rose
Robert E. Kemper
INVENTORS

BY Thomas E. Sterling

ATTORNEY

United States Patent Office 3,319,403
Patented May 16, 1967

3,319,403
CHROMATOGRAPHIC DEVICE
Arthur Rose, State College, Pa. 16801, and Robert E. Kemper, R.D.1, Port Matilda, Pa. 16870
Filed Aug. 10, 1965, Ser. No. 482,997
6 Claims. (Cl. 55—386)

This application is a continuation-in-part application of patent application Ser. No. 215,946, filed Aug. 9, 1962, entitled, Chromatographic Device and Process, by Arthur Rose and Robert E. Kemper, now abandoned. The total drawing, FIGURES 1–6 of the parent application, is utilized as partial drawing in the present application.

This invention relates to gas chromatography in general, and in particular to an improved gas chromatography capillary column or capillary for use therein. The device of the invention is particularly advantageous in that the operative surfaces thereof may be inspected after coating but prior to use, and the capillary may be cleaned after use and reused indefinitely.

The art of gas chromatography, also known as gas or vapor fractometry, is based on the separation of a sample-carrying gas phase as it is passed over or through a liquid or solid phase, the latter being typically placed in a column and called the "fixed" phase. In elution-partition separation, the column is packed with an inert material which supports a liquid fixed phase, and the sample-carrying gas phase is passed therethrough. In elution-absorption separation, the column is packed with adsorptive material, such as silica gel, which comprises the fixed phase, and the sample-carrying gas is passed through as before.

Originally, this general method, which used liquid as a carrier, was employed to effect color changes in the column, giving rise to the name, chromatography, but with advancing technology, gases were introduced as carriers and various other indicating means have been employed. Thus differences in thermal conductivity, ionization potential or density between incoming and outgoing gas may be utilized as the indicator.

In operation, most conventional chromatographic columns require about twenty minutes or more to treat a sample. During this period, it is necessary to maintain the column at a temperature at which the sample contained in the carrier gas remains as a gas. If the sample has a high boiling point, this might often lead to pyrolysis of a constituent of the fixed phase or some other change which renders the column either completely or partially inactive. Plugging of the column by the packing material is also a source of trouble. Such problems can be overcome, as by repacking the column, which is generally about ¼ inch inside diameter and six or nine feet long, but this is very troublesome.

More recently, an improvement in column construction has been achieved by the use of unpacked columns, where the adsorbing or partitioning agent is applied directly to the walls of the column. Such a column may have a very small internal diameter and have equal or greater surface area exposed to the sample per unit length as compared to a packed column. Unpacked coated columns are commonly made longer than packed columns. For example, a typical column of this type is thirty-two feet long with an inside diameter approaching capillary size, in the order of 0.010 inch. The column can be readily fabricated out of steel tubing of the type used in hypodermic needles. To coat such a column, a dilute solution of the fixed phase agent can be pumped into the tube, for example with a hypodermic syringe, one end of the tube closed when it is full, and the assembly then heated to drive off the solvent. A thin coating of the active agent on the inside of the tube results. In operation, it has been established that this type of fractometer column provides results of improved accuracy in a substantially shorter period of time.

There exist, however, several disadvantages to the use of the above-described unpacked columns. Firstly, it is impossible to tell whether the coating is uniform throughout the length of the tube prior to use. Plugging can very easily result, due to the very narrow diameter thereof, and once a plug has formed it is often impossible to remove. Thus, many such unpacked columns are of limited use after they have been prepared, or they become useless after a limited number of analyses. Finally, practitioners have often found it more convenient to discard such a column after limited use, in spite of its expense, due to the difficulty of cleaning the fixed phase out of it, and the uncertainty that the tube is entirely clean. This, of course, adds very substantially to the cost of this type of analysis.

Accordingly, it is an object of the present invention to provide a chromatographic capillary which is very simple to coat, which may be inspected prior to use, and which may be readily cleaned and reused with no chance of contamination by prior fixed phase agents.

It is further an object of the invention to provide a very economic capillary device which is both initially inexpensive and long-lived.

These and other objects of the invention will become clear in the course of the following discussion of various embodiments of the invention.

Briefly, the present invention is characterized in that, rather than using an elongated tube of capillary size, two separate elements are employed which, when fitted together, form a continuous capillary-sized passage for the sample-carrying moving (gas) phase. By coating one or both elements prior to assembly it is possible to obtain a uniform coating thereon and to visually or otherwise check the coating to make sure of this. By use of well-known forming and cutting techniques the shape and roughness of the passage may be adjusted in ways that give advantageous results. If at any time the apparatus ceases to function satisfactorily, it is a simple matter to disassemble the two elements and thoroughly clean them. Mild heat and solvents are often helpful.

It is believed that a better understanding of the various embodiments of the invention will be gained by referring to the following detailed explanation of the same taken in conjunction with the drawings, in which, FIGURE 1 is an elevational view of one embodiment of the invention;

FIGURE 2 is an enlarged sectional view illustrating the interface between the two elements shown in FIGURE 1;

FIGURE 3 is a top view of a second embodiment of invention;

FIGURE 4 is a sectional view of a third embodiment of the invention;

FIGURE 5 is a top view of a fourth embodiment of the invention;

FIGURE 6 is a sectional view of the embodiment illustrated in FIGURE 5, as assembled and ready for operation;

Figure 7:
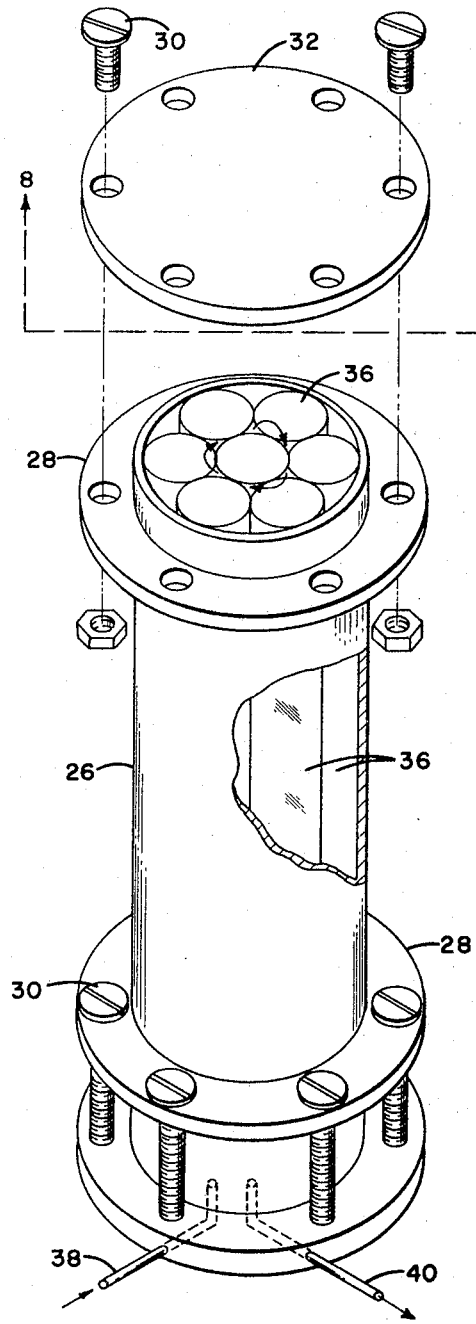
FIGURE 7 is a plan view, partially in section, of a fifth and preferred embodiment of the invention in which the elements consist of a bundle of wires or rods laid parallel to one another and bound tightly together after being treated to cover then with a suitable stationary phase.
Figure 8:
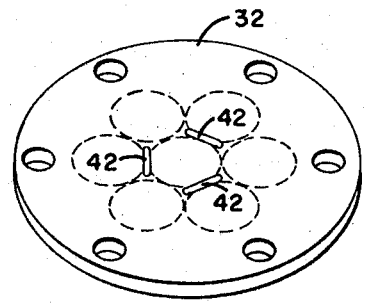
Figure 9:
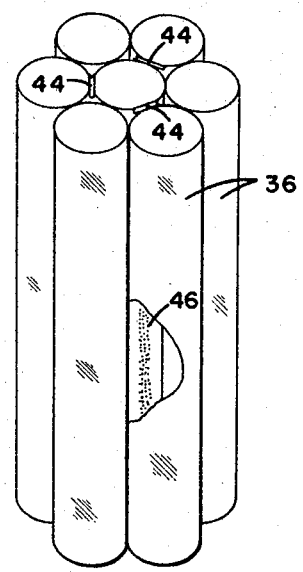

FIGURE 8 is a view of the top end piece of FIGURE 7 taken in the direction of the line 8—8 showing grooves cut in the surface of the end piece for passage of gas from the channel at which it issues to the entrance of another channel; and FIGURE 9 is a plan view of a modification of the invention showing the rods of FIGURE 7 with grooves cut in the end pieces of the rods for the passage of gas from the channel at which it issues to the entrance of another channel.

FIGURE 1 shows what is perhaps the simplest embodiment of the invention, which consists merely of a threaded plug 10 which is covered, in operation, by a smooth-walled sleeve 11. As shown, plug 10 and sleeve 11 are slightly tapered, so that a close frictional engagement may be obtained by merely pressing the two elements together. It is to be understood that this is an optional feature, as the plug and sleeve may be perfectly cylindrical, and the two units assembled by shrink-fitting or the like. It is also possible to split sleeve 11 longitudinally so that it may be spread apart to fit over plug 10, but it must close completely so as to provide a continuous passage for the gas.

FIGURE 2 shows an enlarged view of the interface between plug 10 and sleeve 11. It will be noted that it is desirable to have the threads 12 slightly spaced apart, so that a flat surface is presented to the sleeve 11, thus ensuring that the gas phase will be truly confined to the passage formed by the threads and the sleeve, with no chance of a "short circuit" to adjacent threads.

The plug and sleeve may be fabricated out of any suitable metal, alloy, plastic or other material which may be either cast or machined with the required smoothness and tolerance, and which will not be adversely affected at any elevated temperatures used in the analyses.

An alternative embodiment to that shown in FIGURES 1 and 2 involves threading both the plug 10 and the sleeve 11 but adjusting the pitch and height of the threads in each so that when the two are screwed together, a passage of appropriate size is left therebetween.

Any convenient means may be employed for connecting the capillary passage formed between the two elements to the chromatographic apparatus. One method involves threading the outside of the sleeve 11 at both ends, and providing suitable caps to fit thereover, which caps are connected, in turn to the apparatus. An alternative method involves terminating the threads a short distance from either end of the plug, and drilling a small hole from each end of the thread through the plug to the adjoining face. Two holes may of course be used in each end if desired, one from the end of the thread radially into the block, and another parallel to the axis of the plug meeting the first within the plug. In either case, the holes in both ends of the plug are connected to the apparatus.

A second embodiment of the invention is shown in FIGURE 3, in which a flat disc 13 is provided with concentric, interconnected grooves 14 or a spiral groove as on a phonograph record. The groove 14 terminates at points 15 and 16 and a second plate 17 is clamped onto the grooved plate. Plate 17 can be provided with holes 15' and 16', corresponding to the terminal points of the groove on plate 13, for allowing ingress and egress of the moving phase or, alternatively, holes can be drilled through plate 13 at points 15 and 16, in which case plate 17 will be flat and smooth without any holes. The engagement between the two plates, which can be held or pressed together in any convenient manner, is the same as illustrated in FIGURE 2.

The embodiment shown in FIGURE 4 is similar to the one shown in FIGURE 1, but rather than using a threaded plug, a smooth plug 18 upon which fine wire 19 has been closely wound is employed. As can be seen, the wire forms channels between the plug 18 and the sleeve 11. While only one layer of wire 19 has been illustrated, it is of course possible to employ a plurality of layers in close-packed arrangement, and a continuous channel will still be formed. In the latter case, sleeve 11 need not be used as the wire forms the channel. In utilizing this embodiment of the invention, it is necessary only to use care that the wire is of uniform diameter, as even small variations therein will allow cross-connections between adjacent channels, thus shortening the effective length of the capillary. Coating may be applied to plug 18, wire 19 and/or sleeve 11. After the coating is applied to plug 18, wire 19 and/or sleeve 11; the wire 19 is tightly wrapped about the plug 18 so that each wrapped turn is firmly in contact with the previously wrapped turn and with plug 18. The surface of the adjacent turns and plug 18 thus form a continuous passage in the form of a helix through which gas may be introduced. The cross-sectional view of FIGURE 4 indicates this passage. When an entire winding of wire 19 has been made on plug 18, sleeve 11 may be firmly placed over the winding of wire 19 so as to press each coil, securing it in place. While wire of circular cross section is readily available, wire of certain other cross sections, square or rectangular may also be used. As may be readily seen two concentric helical passages result from the modification illustrated in FIGURE 4. The use of either or both of these helical passages is contemplated in the practice of the invention. For example, by use of a suitable end connection, a continuous stream may be achieved, moving in one direction through one passage, and in the opposite direction in the other passage.

The embodiment illustrated in FIGURES 5 and 6 requires only a single element to accomplish the objects of the invention, although as shown in FIGURE 6, two elements may be used. In this embodiment, a length of flexible tape 21, made of either metal, plastic, plastic-coated fabric or other suitable material, is provided with grooves 21 which are interconnected at the ends to comprise one continuous groove terminating at points 22 and 23. After coating the groove with the fixed phase agent, it is only necessary to wind the tape into a tight spool to form the continuous capillary passage of the invention. As shown in FIGURE 6, it is convenient to start the winding around a suitable spool or cylinder 24, but this is not necessary if sufficient "leader" is left at the inside and so all of the groove will be covered. The cylinder 24 is also convenient, however, for securing sufficient tension in the wound tape to insure there being positive contact between each layer; that is, the inside end of the tape 21 can be securely fastened to the cylinder 24 and tension applied as winding proceeds, to make it as tight as possible. In this respect, it is advantageous to use a tape with a slightly compressible surface, as this also helps insure positive contact. Connection of the ends of the groove 23, 24 to the chromatographic apparatus is again conveniently accomplished by punching holes through the tape at the lead end and securing suitable connectors thereto.

Referring now to FIGURES 7 and 8, there is shown a bundle of straight wires or rods 36, which have been treated to cover them with a suitable stationary phase, laid parallel to one another, bound tightly together and enclosed longitudinally in a cylindrical container 26. In this arrangement the channels for gas flow are the open space between the tangentially contacting rods 36. Each of three rods 36, tangentially contact each other along their entire length to form a channel whose cross section is the tangential intersection of three circles. Since in practice a number of rods 36 are used, a number of such parallel channels are formed the length of the rods 36.

Circular flanges 28 extend radially from cylindrical container 26 near the ends thereof. Upper and lower circular disc-shaped end pieces 32 are positioned on the end portions of cylindrical container 26 so as to bear directly on the end faces of rods 36. Upper and lower end pieces 32 are secured to cylindrical container 26 by means of screws 30 which pass through aligned holes in the outer edge portion of end pieces 32 and in flanges 28. The screws 30 are then appropriately bolted so as to press upper and lower end pieces 32 into the end portions of cylindrical container 26 and the faces of rods 36. In practice the faces of rods 36 may extend slightly beyond the ends of cylindrical container 26 so as to allow end pieces 32 to be more securely pressed into the faces of rods 36. It is of course within the contemplation of the invention that other clamping or securing means may be used to secure end pieces 32. A gas entrance tube 38 extends into the edge of lower end piece 32 to communicate with an entrance channel, formed by three of the rods 36. Likewise an exit tube 40 extends from an exit channel, formed by three of the rods 36 from which gas leaves the device. Gas entrance tube 38 and exit tube 40 may of course extend directly through the face of lower end piece 32 to reach the appropriate channels.

Referring now to FIGURE 8, there is shown the surface of upper end piece 32 which presses into the faces of rods 36. Grooves 42 are cut in the surface of end pieces 32 so as to provide for the conducting of gas from a point at which it issues from a channel at the end of the rod bundle 36, to the entrance of an adjacent channel through which the gas can pass in the direction opposite to that in which it flowed in the last previous channel, as shown by the direction of the arrows. Lower end piece 32 has similar grooves 42.

An alternative to this arrangement, as seen in FIGURE 9, is to cut slots 44 at the edges of faces of rods 36 so as to provide for the conducting of gas from one channel at the end of the rod bundle to the entrance of an adjacent channel. In this arrangement the end pieces 32 would be perfectly flat and have no grooves 42 cut therein. In the embodiments shown in FIGURES 7, 8 and 9, both the faces of rods 36 and the matching surface of end pieces 32 are finished perfectly flat so as to provide a leak proof mating.

In operation, gas passes through entrance tube 38 to an entrance channel formed by three tangentially touching rods 36, proceeds through the channel to upper end piece 32 where it is conducted by means of grooves 42 or slots 44, depending on embodiment used of FIGURE 8 or FIGURE 9, to the entrance of adjacent channel through which the gas passes in the direction opposite to that in which it flowed in the last previous channel, as shown by the direction of the arrows. When the gas reaches the lower end piece 32 the process is repeated, thus allowing the gas to pass back and forth through a large number of channels and ultimately out of the device through exit tube 40.

Although a cylindrical container 26 is shown in this particular embodiment of the invention, it is to be understood that numerous other shapes of containers may be utilized, as for example rectangular, square, etc. Likewise, although for simplicity only seven rods 36 have been shown to form six gas conducting channels in this embodiment, it is understood that in practice a much larger number of rods 36 are used to form a much larger number of channels.

The tube bundle assemblage of FIGURES 7, 8 and 9 is preferred for most uses because its elements are readily available standard materials that can be used as delivered from stock for the invention disclosed herein. No machinery of grooves, etc., is required except for the end pieces which can be easily made by standard equipment. Further, a multitude of channels are formed by an extremely simple, easily achieved assembly method to produce a very compact unit with great length of channels in a small volume. In addition the channel cross-section formed by the three tangent arcs is a uniquely advantageous cross-section for gas chromatographic purposes, because the average distance from points in the gas stream to points on the wall where the separation actually occurs is less than for other commonly used cross-sections, is more difficult to plug and has greater efficiency.

As should be obvious, the coating and cleaning of any and all of the foregoing embodiments of the invention are extremely simple operations. The fixed phase agent can be dissolved in a suitable solvent, the threaded plug, disc, wire-sound plug or tape dipped thereinto, and then dried at a temperature sufficient to drive off the solvent. The sleeve or cover plate may also be coated if desired. Alternatively, the agent may be brushed or sprayed on. While a solution of the fixed phase agent is normally used, suspensions and emulsions can be used and, in some cases, it is possible to apply the agent directly in liquid form. In the case of adsorption agents, it is convenient to dust on a powder thereof. Naturally, it is necessary that this operation be carried out in an atmosphere free of lint, foreing matter and so forth. The coating may be checked visually prior to assembly to see that it is even and free from objects which might plug the capillary. The unit is then assembled and connected to the chromatograph, and the test run. When desired or necessary, it is then equally easy to disassemble the apparatus and wash the coating out with a suitable solvent. As there is complete access to the groove when the unit is disassembled, there can be no doubt about the effectiveness of the cleaning operation. While not generally preferable, it is of course possible to clean and coat these columns while they are in assembled form, using any suitable cleaning and coating method. Employment of units of the type described therefore provides all of the advantages of using capillary-sized unpacked columns, that is extremely rapid and accurate analysis, without any of the disadvantages thereof, including the general cumbersomeness of working with a 30-foot length of tubing which must be coiled or bent so as to fit into chromatographic apparatus.

Although this invention has been described with a certain degree of particularity, it is understood that the embodiments described are by way of example only and that modifications may be made without departing from the spirit of the invention.

Having thus described the subject matter of our invention what is desired to secure by Letters Patent is:

1. A column for the separation of mixtures of gases by fixed phase-moving phase chromatography comprising:
   at least three straight rods disposed in parallel relationship and in tangentical contact with one another forming a plurality of parallel channels therebetween containing chromatographic separating material;
   clamping means adapted to secure said plurality of rods in fixed position;
   means to connect the end portions of each of said channels formed by said at least three straight rods, with another of said channels, so as to form a continuous passage therethrough;
   an entrance means for introducing gas into one end of said continuous passage;
   an exit means for retrieving gas from another end portion of said continuous passage;
   whereby said gas travels the entire length of said continuous passage formed by said channels.

2. The combination as claimed in claim 1 in which the surface of said at least three straight rods is coated with a chromatographic fixed phase.

3. The combination as claimed in claim 2 in which each of said channels of said plurality of channels is formed by three circular rods of equal diameter, said rods so positioned that a pair of said three rods is in contact with and tangent to another of said three rods, along two lines.

4. A chromatographic apparatus for the separation of the component mixtures of gases and vapors by fixed phase-moving phase chromatography, comprising in combination:
   at least three straight cylindrical rods of circular cross section disposed in parallel and tangential contact with one another forming a plurality of channels therebetween;
   cylindrical clamping means adapted to secure said plurality of cylindrical rods in fixed relationship with one another;
   a fixed phase chromatographic coating covering the surface of said rods;

an upper end piece positioned on one end portion of said plurality of cylindrical rods, perpendicular thereto, said upper end piece having grooves on the inner surface thereof adapted to connect the end portion of each of said channels with the end portion of an adjacent channel so as to form a continuous passage therethrough;

a lower end piece positioned on one end portion of said plurality of cylindrical rods, perpendicular thereto, said lower end piece having grooves on the inner surface thereof adapted to connect the end portions of each of said channels with the end portion of an adjusted channel so as to form a continuous passage therethrough;

an entrance tube extending through said lower end piece, connected to one end portion of said continuous passage;

an exit tube extending through said lower end piece, connected to the other end portion of said continuous passage;

whereby a moving phase gas may pass through said continuous passage initiating a chromatographic process therein.

5. The combination as claimed in claim 4 in which screw clamping means secures said upper and lower end pieces on the end portions of said at least three straight cylindrical rods.

6. A chromatographic apparatus for the separation of the component mixtures of gases and vapors by fixed phase-moving phase chromatography, comprising in combination:

at least three straight cylindrical rods of circular cross section disposed in parallel and tangential contact with one another forming a plurality of channels therebetween; each of said channels being connected to an adjacent channel by slots in the end portions of said rods;

a fixed phase chromatographic coating covering the surface of said rods;

cylindrical clamping means adapted to secure said plurality of cylindrical rods in fixed relationship with one another;

two end pieces positioned on the end portions of said plurality of cylindrical rods and perpendicular thereto; forming a continuous passage through said channels;

an entrance tube extending through one of said end pieces, connected to one end portion of said continuous passage;

an exit tube extending through one of said end pieces, connected to the other end portion of said continuous passage;

whereby a moving phase gas may pass through said continuous passage initiating a chromatographic process therein.

References Cited by the Examiner

UNITED STATES PATENTS

| 2,723,923 | 11/1955 | Munters | 117—119.8 X |
| 2,960,183 | 11/1960 | Kelley | 55—386 X |

FOREIGN PATENTS

| 636,078 | 2/1962 | Canada. |
| 37–5143 | 6/1962 | Japan. |
| 38–7596 | 5/1963 | Japan. |

OTHER REFERENCES

Nikelly: Analytical Chemistry, vol. 34 (April, 1962), pp. 472–475.

REUBEN FRIEDMAN, *Primary Examiner.*

C. HART, *Assistant Examiner.*